United States Patent
Fox et al.

(10) Patent No.: US 9,064,068 B1
(45) Date of Patent: *Jun. 23, 2015

(54) DEBUGGABLE OPAQUE IP

(75) Inventors: Jeffrey R. Fox, Los Gatos, CA (US); Philip A. Simpson, San Jose, CA (US)

(73) Assignee: Altera Corporation, San Jose, CA (US)

(*) Notice: Subject to any disclaimer, the term of this patent is extended or adjusted under 35 U.S.C. 154(b) by 1052 days.

This patent is subject to a terminal disclaimer.

(21) Appl. No.: 12/168,697

(22) Filed: Jul. 7, 2008

Related U.S. Application Data

(63) Continuation of application No. 10/861,893, filed on Jun. 4, 2004, now Pat. No. 7,409,652.

(51) Int. Cl.
G06F 17/50 (2006.01)

(52) U.S. Cl.
CPC ........ G06F 17/5027 (2013.01); G06F 2217/86 (2013.01)

(58) Field of Classification Search
CPC ................. G01R 31/318364; G06F 11/3656; G06F 17/2057; G06F 17/5045; G06F 17/5054; G06F 2217/86
USPC .......................... 716/100–107, 116–117, 136
See application file for complete search history.

(56) References Cited

U.S. PATENT DOCUMENTS

| | | | |
|---|---|---|---|
| 6,754,862 B1 | 6/2004 | Hoyer et al. | |
| 7,409,652 B1 | 8/2008 | Fox et al. | |
| 7,574,679 B1 * | 8/2009 | Gathoo et al. | 716/1 |
| 2002/0138244 A1 * | 9/2002 | Meyer | 703/14 |
| 2003/0069724 A1 * | 4/2003 | Schubert et al. | 703/16 |
| 2003/0131325 A1 * | 7/2003 | Schubert et al. | 716/4 |

OTHER PUBLICATIONS

Altera Corporation, Altera's Quartum II Version 3.0 Design Software Delivers Direct Path to ASIC-Level Performance, Jun. 2003, 2 pages.
Altera Corporation, "Quartum II Software Release Notes," Quartus II Version 3.0, Jul. 2003, 40 pages.
Fox, et al., "Debuggable Opaque IP," U.S. Appl. No. 10/861,893, filed Jun. 4, 2004.
Office Action mailed Jul. 2, 2007 for U.S. Appl. No. 10/861,893.
Final Office Action mailed Nov. 8, 2007 for U.S. Appl. No. 10/861,893.

* cited by examiner

*Primary Examiner* — Paul Dinh
(74) *Attorney, Agent, or Firm* — Weaver Austin Villeneuve & Sampson LLP

(57) ABSTRACT

Partially opaque intellectual property (IP) includes source code providing the IP functionality. Meta-comments (pragmas or attributes) are provided with the source code to enable visibility of one or more nodes in the IP. Aliasing of the visibility-enabled nodes may also be provided for using meta-comments in the IP source code. The visibility-enabled nodes may be used by system designers in debugging a system design in either a software simulation environment and/or in debugging of a hardware device implementing the partially opaque IP.

19 Claims, 4 Drawing Sheets

DEBUGGABLE OPAQUE IP

CROSS REFERENCE TO RELATED APPLICATIONS

The present application is a continuation of and claims priority to co-pending U.S. patent application Ser. No. 10/861,893, filed Jun. 4, 2004, which is incorporated herein by reference in its entirety.

BACKGROUND OF THE INVENTION

1. Field of the Invention

This invention relates generally to methods, machine readable media and apparatus for use in connection with testing, evaluating and debugging generally opaque intellectual property ("IP"). More specifically, this invention relates to a technique for providing limited visibility of nodes, signals and other information in encrypted IP.

2. Description of Related Art

In the field of electronics, various electronic design automation (EDA) tools are useful for automating the process by which integrated circuits, multi-chip modules, boards, etc., are designed and manufactured. In particular, electronic design automation tools are useful in the design of standard integrated circuits, custom integrated circuits (e.g., ASICs), and in the design of custom configurations for programmable integrated circuits. Integrated circuits that may be programmable by a customer to produce a custom design for that customer include programmable logic devices (PLDs). Programmable logic devices refer to any integrated circuit that may be programmed to perform a desired function and include programmable logic arrays (PLAs), programmable array logic (PAL), field programmable gate arrays (FPGA), complex programmable logic devices (CPLDs), and a wide variety of other logic and memory devices that may be programmed. Often, such PLDs are designed and programmed by a user with an electronic design automation tool that takes the form of a software package. A wide variety of these devices are manufactured by Altera Corporation of San Jose, Calif.

Modular design can significantly accelerate the implementation of a system design in electronic devices. A user (also referred to herein, as appropriate, as a "customer" and/or "system designer") can partition a design into logic blocks, for example wherein each logic block provides a specific functionality. These logic blocks can be implemented on the target device using cores of intellectual property (IP). IP may, for example, be a high-speed serial interface (HSSI), a digital signal processor or other microprocessor, ALU, memory, or a multiplier. "IP" may also be referred to herein as an "IP block" or an "IP core," as appropriate and as will be appreciated by those skilled in the art. These terms are generally interchangeable for purposes of the present invention, unless otherwise indicated specifically or contextually.

The "IP designers" discussed herein are the individuals who develop and create IP that can be used in various electronic designs. This IP is designed to be plugged into designs and used, more or less, as building blocks for larger systems. An electronic system in many cases comprises logic designed by system designers, where the designed logic incorporates one or more pre-designed blocks of IP. Such IP is typically designed by different individuals than the designers of the overall system. When the IP is designed by a different company than the system in which the IP is used, the company providing the pre-designed IP typically has an interest in keeping the implementation details of the IP a trade secret and discouraging its unauthorized use.

EDA tools provide system designers with automated tools for designing and verifying circuit designs. EDA helps create, analyze and edit proposed electronic designs for purposes of simulation, prototyping, debugging, execution, computing, etc. EDA also can be used to develop systems that will use one or more user-designed subsystems and/or components in connection with pre-existing IP provided by another party.

In the course of generating an electronic design, simulation, timing analysis and/or other techniques may be used to debug the electronic design. During the course of a debugging simulation, a designer monitors various signals at nodes in the electronic design. Being able to identify signal behavior at specific nodes in the proposed electronic design allows the system designer to track down the source of errors or other problems and/or otherwise gather and use information regarding the behavior and operation of the proposed design.

As mentioned above, IP designed by one entity often is delivered to system designers as an encrypted netlist, encrypted RTL, or some other "opaque" version of the IP, as will be appreciated by those skilled in the art. IP whose implementation details are not readily visible to users will be referred to as "opaque" IP herein. IP can be provided in several forms: as drop-in blocks that include all of the information needed to realize the design, such as providing complete mask-level realization data for an ASIC core, as fixed functions that may or may not contain complete mask-level realization data, or in a parameterizable form that may or may not incorporate all of the data needed to realize the design. In the case of Altera IP, it usually is supplied as parameterizable RTL or netlists that are synthesized on the customer's desktop. No mask-level realization data is supplied.

Since the IP is essentially opaque to the user, it is not practicable for the user to probe internal nodes (for example, key registers, signals and state machines) to see the IP's state during the system debugging process carried out in simulation and/or running in hardware. This lack of visibility into an IP core can impede the system design and debugging process and can leave the user wondering if a problem is due to errors in the portion of the system the user designed or a problem with the IP.

Earlier debugging and analysis techniques and systems (which have not covered the debugging of opaque IP) have added features to the proposed electronic design (for example, in the RTL code) by synthesizing debugging logic into the design itself. These added features and/or circuits change the proposed design by building the diagnostics into the system. Therefore, debugging done inside the hardware using these types of techniques actually leads to changes the design, which is not always desirable.

Another approach to debugging a hardware device within a working system is to use a separate piece of hardware equipment called a logic analyzer to analyze signals present on the pins of a hardware device. Typically, a number of probe wires are connected manually from the logic analyzer to pins of interest on the hardware device in order to monitor signals on those pins. The logic analyzer captures and stores these signals. However, the use of an external logic analyzer to monitor pins of a hardware device has certain limitations when it comes to debugging such a device. For example, such an external logic analyzer can only connect to and monitor the external pins of the hardware device. Thus, there is no way to connect to and monitor signals that are internal to the hardware device. Unfortunately, when programming a hardware device, it is useful to monitor some of these internal signals in order to debug the device. One solution to this problem has been Altera's SignalTap, which is well known to those skilled in the art.

Although some hardware devices may come ready made with some internal debugging hardware, this debugging hardware typically is hardwired to route specific internal signals and cannot be readily adapted by a user who wishes to look at other signals. Because a programmable device is by its very nature a device that a user is attempting to program to perform a particular function, it is important to the user to be able to specify signals to be monitored, as well as trigger signals and trigger conditions in order to efficiently debug any particular device. Further, creating an electronic design for a programmable device is an iterative process that requires creative debugging by a user who may wish to monitor various signals, and who may change his mind on which signals to monitor fairly frequently in the course of debugging a PLD within a system. Known external and internal logic analyzers do not provide this flexibility with regard to generally opaque IP.

Techniques that permit thorough development and evaluation of digital systems and devices by system designers and other users, while maintaining proprietary IP protection (for example, by IP block opaqueness), would represent a significant advancement in the art. Moreover, it would be a further advancement if these techniques were adaptable to allow an IP designer to enable visibility and assign meaningful aliases for one or more useful nodes within opaque IP and to allow the system designer to select certain of these visibility-enabled nodes in debugging and other settings and contexts.

BRIEF SUMMARY OF THE INVENTION

Partially opaque intellectual property (IP) blocks comprise generally non-visible source code that implements the functionality of the IP. Meta-comments, pragmas, attributes and/or the like are embedded in the source code by the IP designer to provide the IP user with visibility of one or more nodes internal to the IP. Aliasing of the visibility-enabled nodes may also be provided by using meta-comments in the IP source code. The visibility-enabled nodes may be used by system designers in debugging a system design in either a software simulation environment and/or in debugging of a hardware device that includes the partially opaque IP.

In one embodiment of the present invention, the partially opaque IP is provided in a computer program product having program instructions for implementing an IP block, where the instructions include instructions for implementing the IP block and meta-comments enabling the visibility of at least one node in the IP block. The instructions for implementing the IP block and the meta-comments, pragmas and/or attributes enabling the visibility of at least one node in the IP block are provided in an opaque format. This opaque format can be encryption, obfuscation, or any other mode that generally prohibits or restricts the visibility of nodes in the IP to users. In addition to enabling visibility of the nodes, which are selected by the IP designer, the visibility-enabled nodes may be assigned aliases to facilitate use of the visible nodes by users. In some embodiments, domain specific visualization means (for example, frequency domain plots for DSP cores) may also be specified.

Other embodiments of the present invention include methods of debugging an electronic design wherein a user is presented with the opportunity to designate one or more visibility-enabled nodes in an opaque IP block used in the electronic design from a list of potential visibility-enabled nodes. The user-specified list of designated nodes is received and used to provide the user with information about signals at the designated visibility-enabled nodes. Again, these signals may have aliases assigned to them. The method can be used during simulation of the electronic design and/or during debugging of a hardware device (such as a programmable device) that contains an implementation of the opaque IP block.

In an EDA system, the present invention can be used to allow system designers to view nodes selected and enabled by the IP designer in encrypted or otherwise opaque IP. The partially visible IP can assist system designers in debugging their designs and in otherwise gathering and using information regarding the behavior and operation of opaque IP in the designs.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
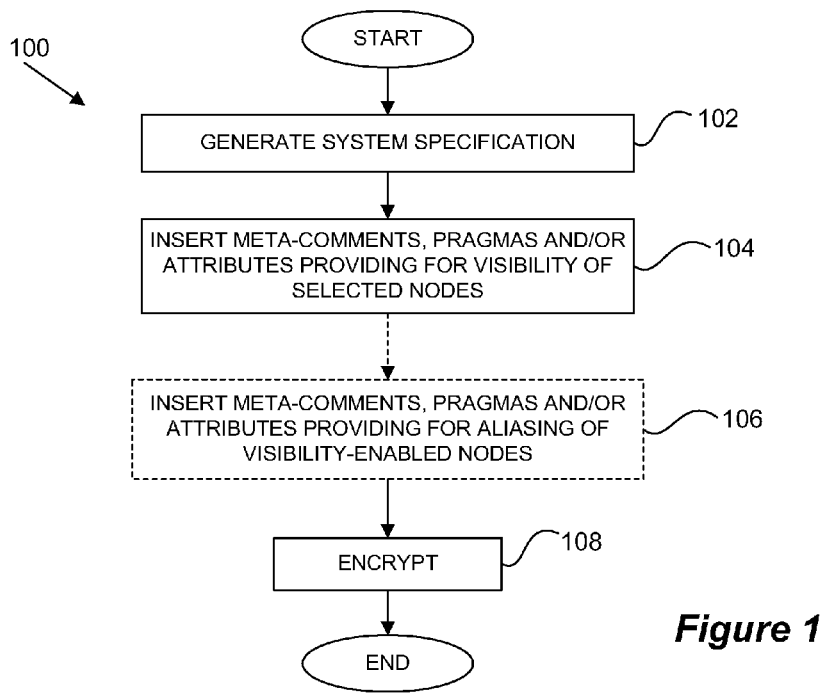
FIG. 1 is a flow diagram illustrating one embodiment of the present invention.

The following detailed description of the invention will refer to one or more embodiments of the invention, but is not limited to such embodiments. The detailed description is intended only to be illustrative. Those skilled in the art will readily appreciate that the detailed description given herein with respect to the Figures is provided for explanatory purposes as the invention extends beyond these embodiments.

To develop an electronic design for programming a hardware device (for example, a PLD), a programmable logic development system frequently is used. A design methodology employing pre-existing blocks of IP and the like (typically pre-characterized and parameterizable) can be used to develop a proposed electronic design. For convenience, the following discussion may refer to "integrated circuits" or "PLDs" in addition to hardware devices, though the invention is not limited to any particular type of hardware device, as will be appreciated by those skilled in the art. Moreover, opaque IP may be referred to herein as "encrypted IP" as well, though again the invention is not limited solely to IP whose opaqueness is due solely to encryption.

Partially Visible Opaque IP

The present invention includes methods for creating an IP core or other pre-characterized block of IP for use in an electronic design, where the core is encrypted or otherwise opaque, but still allows a user limited access to specific information about the behavior of the core while it is operating in simulation and/or in hardware. More specifically, partially visible opaque IP according to the present invention provides a user with limited visibility of the signals passing through and/or residing in certain nodes of the encrypted IP. The present invention also includes computer program products comprising such partially visible opaque IP.

IP modules are delivered to many users as encrypted or otherwise generally opaque netlists or RTL. When delivered this way, the IP appears to the user a "black box," with no visibility into the behavior of internal nodes. Only signals at the periphery can be examined. Predefined parameters are defined by the IP designer. The parameter values are specified by the user of the IP and resolved by the design tool when the IP is instantiated into a system design by the user.

The IP designer uses his full knowledge of the internal state of an IP core during the design and verification of the IP. Knowledge of the internal state of a core can also be helpful to users of an IP core in cases where the correctness of the IP is not in question. For example, if a user is using a bus controller core, it might be useful for the user to monitor internal signals and registers that can be addressed, which are not visible from the primary I/O of the controller core. This information can be useful when simulating a system containing the core as well as when debugging the system design in hardware. The present invention makes certain IP internal nodes (for example, key registers, pins and state machines) visible to the user to provide for better visualization, analysis and debugging of the user's designed system that contains the opaque IP. To achieve this goal, the IP designer designates certain IP nodes visible inside HDL design source files. A synthesizer (for example, Altera's Quartus Integrated Synthesis) preserves and forwards this node visibility information so that a node location tool (for example, Altera's Node Finder utility) can display either all or selected internal nodes in the opaque IP. The IP designer preferably is able to assign meaningful names (aliases) to these internal nodes to facilitate the user's understanding and use of the internal information provided. In some embodiments of the present invention, a user (for example, a system designer) may assign their own aliases (thus replacing the IP designer's assigned aliases) using a node locating tool. Illustrative examples of how an IP designer can provide such limited visibility and aliasing in Verilog and VHDL files are provided below.

An IP designer also can specify names for state machines; register names within state machines; symbolic state names; symbolic names for finite state machine input and output signals; multi-bit signals (that is, bit vectors and/or busses) and fields within the busses; symbolic representations of signal, state and field values; numerical and logical representations for specific signals; and other domain specific visualization means (for example, frequency domain plots for DSP cores). All of this information will be referred to collectively herein as "IP designer-specified internal information" and may include all or some of the above-noted examples and may include other internal information, as will be appreciated by those skilled in the art.

In some embodiments of the present invention, meta-comments (also referred to as pragmas or attributes) in the RTL source code provide this support. The terms "meta-comments," "pragmas" and "attributes" are generally interchangeable for the purposes of illustrating and explaining embodiments of the present invention, as will be appreciated by those skilled in the art. Where differences between these terms are relevant, those skilled in the art will be able to differentiate their usage. However, unless otherwise indicated specifically or contextually, use of one or more of these terms includes the others and any other, similar terms. These meta-comments or attributes are used to identify the signals that should be made visible to a system designer/user. In still other embodiments of the present invention, the meta-comments or attributes also provide for a representation of these signals and a visualization method. Using meta-comments or attributes thusly permits several embodiments:

1—Designing and providing only one version of the IP core having meta-comments, attributes and/or the like; or 2—Designing and providing 2 versions of each IP core, one with meta-comments or attributes and one without meta-comments or attributes. Thus, if a user wishes to debug a design, the user would recompile using the version of the core with meta-comments or attributes. Since this could result in a different synthesis, this technique might cause changes to the performance of the core and/or system design; or 3—The IP designer can explicitly embed an instance of a logic analyzer into the core itself prior to synthesis. This implies that there will need to be separate versions of the core for debugging purposes (for example, using a logic analyzer) and for normal implementation. The representation and visualization methods for the chosen signals could still be described via meta-comments or by other means known to those skilled in the art.

The preferred implementation is for the IP designer to provide only one version of the core with the embedded meta-comments or attributes, the effect of which is enabled or disabled by a setting in the synthesis tool such as Altera's Quartus II. In this manner, only one version of a core need be provided. The possible deleterious effects on performance due to the addition of the debug logic can be avoided simply by the user turning off the debug facility in the design tool prior to compilation.

Visibility of certain internal nodes of otherwise opaque IP can be implemented using a special meta-comment, pragma or attribute. For example, the attribute ALTERA_IP_DEBUG_VISIBLE can be attached to nodes in IP source files (in Verilog or VHDL). A reasonable collection of IP nodes in each IP design can be identified and annotated with this attribute by IP designers in their source code. This assignment causes the synthesis tool to make the specified nodes in the encrypted or generally opaque IP available for display during simulation or hardware debugging. The existence of the node can be displayed in a node finder tool that understands this attribute.

Following are examples of node visibility for Verilog and VHDL (these attributes can be written by the IP designer and encrypted within the IP core):

Verilog example:

```
module rxsync (
output pin      RxSyncDone      /* synthesis
                                altera_ip_debug_visible = 1 */; //
                                Visible
reg             sync_seq_det_reg /* synthesis
                                altera_ip_debug_visible = 1 */
                                /* synthesis altera_ip_debug_alias
                                = "sync_seq_det" */; //
                                Visible register with alias name
wire node [7:0] ctl_fall_match,  /* synthesis
                                altera_ip_debug_visible = 1 */; //
                                Visible
```

VHDL example:
architecture rtl of rxsync (
- attribute altera_ip_debug_visible : Boolean;
signal RxSyncDone : bit;
attribute altera_ip_debug_visible of RxSyncDone : signal is true;
   Visible node
   A second attribute can be designated ALTERA_IP_DEBUG_ALIAS (shown in connection with the preceding Verilog register example above), can be optional and can allow the IP designer to substitute a different node name than the given name in RTL source files.
   An illustrative example of this feature can be shown in connection with slicing and renaming subfields of an 8 bit Interrupt ID Register (Verilog: reg [7:0] int_id_reg;) where:
      Bit 0—Interrupt_pending
      Bits 2-1—Interrupt_id
   The naming constraints of the development tool and language that is used must be observed and may require renaming and regrouping parts of the netlist during elaboration before any names are registered with a database where such debug attributes are stored to be associated with the logic gates to which they apply or any assignments allowed. Examples of this metacomment for Verilog and VHDL are shown below.
   A single Verilog meta-comment can specify the entire alias field for a given node. One interrupt id register alias example is reg [7:0] int_id_reg; in its original form. To alias bit 0 as "interrupt_pending" and bits 1 and 2 as "interrupt_id" (and hide bits [7:3]):
      reg     [7:0]    int_id_reg    /* synthesis altera_ip_debug_alias="interrupt_pending [0]; interrupt_id [2:1]"*/;
More formally, ALTERA_IP_DEBUG_ALIAS could be expressed in this syntax:
   /* synthesis altera_IP_debug_alias="alias_name [[alias_range]]; alias_name [[alias_range]]"*/;
General alias restrictions may exist in Verilog (for example, any part of the signal that is not aliased will not be made visible).
   For VHDL, the following example of a specification would work:
      attribute altera_ip_debug_alias : string;
      signal int_id_reg : bit_vector (7 downto 0);
      attribute altera_ip_debug_alias of int_id_reg : signal is "interrupt_pending[0]; interrupt_id[2:1]:;
   A synthesis tool front end may be responsible for Verilog/VHDL file processing and, for each encrypted or generally opaque IP block, decrypts, analyzes and elaborates the entities involved. If elaboration is successful, the resultant netlist is then converted to a gate level netlist. For example, in Altera's Quartus II software, at the end of netlist processing, all special meta-comments, pragmas, attributes and/or the like can be recognized and passed forward. IP debuggable node and state machine attributes get passed forward at this point.
   Synthesis tool front-end language processing to support partial visibility of encrypted or generally opaque IP can include attribute identification, node labeling and data forwarding. For example, in the case of the Quartus II software, it preserves the debug meta-comments or attributes through the synthesis process. Visibility attributes for nodes, boundary pins and state machines are identified, tagged with an appropriate preservation mechanism, and then passed forward to an appropriate persistent database. Node preservation transformations can include:
      Visible Registers—Visible IP register nodes get treated as if they have a "preserve" attribute, which directs the tools to not remove any registers unless they are fanout or fanin free. Register node visibility and preservation attribute handling is done at the time of verification to netlist processing.
      Visible Combinational Nodes—Visible IP combinational (wire and signal) nodes get treated as if they have a "keep" attribute, which causes a special buffer to be inserted at the time of elaboration. This buffer is then converted to a logic cell at the time of verification to logic gate netlist processing.
      Visible Boundary Pins—Visible IP boundary pins are treated in a manner similar to combinational nodes. In some embodiments of the present invention, a special buffer can be inserted at the time of elaboration between the driver and the output pin. Any other mechanism that preserves the signal's visibility (that is, that preventing it from being optimized away at some point) may be used, as will be appreciated by those skilled in the art. Input pins get a buffer on the input pin's net. That special buffer then turns to a hard lcell at the time of netlist conversion. This hard lcell buffer ensures that boundary pins will be visible as long as they get connected up the hierarchy. Pins that do not get connected up the hierarchy are eliminated.
      Visible State Machine Registers—Visible IP state machine registers are handled in a manner identical to visible IP registers. If the register is labeled as visible, the node is tagged with a "preserve" attribute.
   At the time of hierarchy flattening, the netlist has all of the necessary visibility and preservation attributes on registers, internal nodes and pin-connected nodes of an encrypted IP. The netlist is modified to hide all of the non-visible encrypted nodes.
   A node locating tool (such as Altera's Node Finder tool) will only display nodes in the encrypted IP that have the designated attribute. Generally, recognized Verilog/VHDL state machines can maintain their display behavior, showing a list of state names prefixed by the state machine name (for example, <state machine>-<state name>). This naming convention provides a clear representation as well as avoiding state name collisions between multiple state machines. A user can then opt to tap any number of states in various state machines. Any node location tool used with the present invention preferably provides visualization by displaying only the visibility-enabled nodes for encrypted IP cores (using aliases, if they have been specified).
   FIG. 1 shows one method of creating partially visible opaque IP, according to one embodiment of the present invention. Plain text (not encrypted or otherwise opaque) IP block source code is provided at step 102. At step 104 meta-comments, attributes and/or pragmas, which may be similar to those described above, are inserted into the IP block RTL source code to enable visibility of specified nodes in the IP. Optionally, at step 106 additional meta-comments, attributes and/or pragmas are inserted providing for aliasing of the IP nodes having enabled visibility. Finally, at step 108 the IP block, which includes the visibility-enabled node meta-comments (and possibly alias-enabled nodes) is encrypted to create a generally opaque IP block for use by system designers and users.

Programmable Logic Development System

Figure 2:
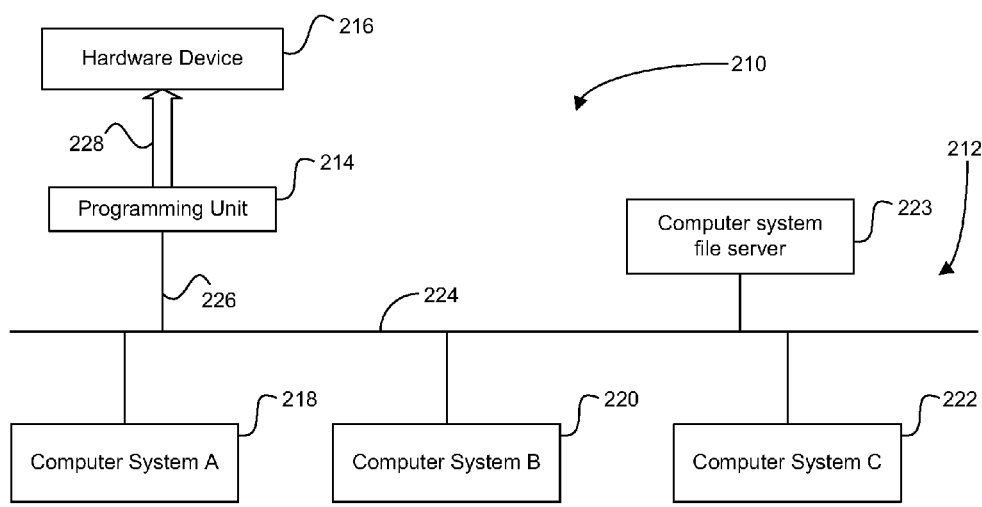
FIG. 2 is a block diagram of an embodiment of a programmable logic development system that can be used in connection with embodiments of the present invention.

FIG. 2 is a block diagram of an embodiment of a programmable logic development system 210 that includes a computer network 212, a programming unit 214 and a hardware device 216 (for example, a programmable logic device) that is to be programmed. Computer network 212 includes any number of computers connected in a network such as computer system A 218, computer system B 220, computer system C 222 and computer system file server 223 all connected together through a network connection 224. Computer network 212 is connected via a cable 226 to programming unit 214, which in turn is connected via a programming cable 228 to the hardware device 216. Alternatively, only one computer system could be directly connected to programming unit 214. Furthermore, computer network 212 need not be connected to programming unit 214 at all times, such as when a design is being developed, but might be connected only when hardware device 216 is being programmed.

Programming unit 214 may be any suitable hardware programming unit that accepts program instructions from computer network 212 in order to program hardware device 216. By way of example, programming unit 214 may include an add-on logic programmer card for a computer, and a master programming unit, such as are available from Altera. Hardware device 216 may be present in a system or in a programming station. In operation, a number of engineers, designers and/or users may use computer network 212 to develop programming instructions using an electronic-design automation software tool. Once a design has been developed and entered, the design is compiled and verified before being downloaded to the programming unit, which then uses the downloaded design to program hardware device 216.

In debugging a whole or partial design in software or implemented on a hardware device using an embodiment of the present invention (or performing any other function benefiting from visibility of nodes in otherwise opaque IP), any of the computers shown or others may be used. Furthermore, programming cable 228 may be used to control the logic analyzer and to receive data from it, or a separate debugging cable may be used to directly connect a computer with hardware device 216.

There are several ways to debug using embodiments of the present invention. In hardware debugging can be done with tools such as Altera's SignalTap from within Quartus. Simulation debugging can be done using VHDL and/or Verilog simulation netlists (IP functional simulation models) that may be simulated with any VHDL or Verilog simulator. In addition, software simulation can be done in the Quartus software without the need for VHDL or Verilog IP functional simulation models.

Such a programmable logic development system is used to create an electronic design. Design entry and processing typically occurs in the context of a "project". A project may include a project file, design files, assignment files and simulation files, together with hierarchy information, system settings and output files, which may include programming files and report files. A project database may also exist, which contains intermediate data structures and version information.

Design Methodology

Figure 3:
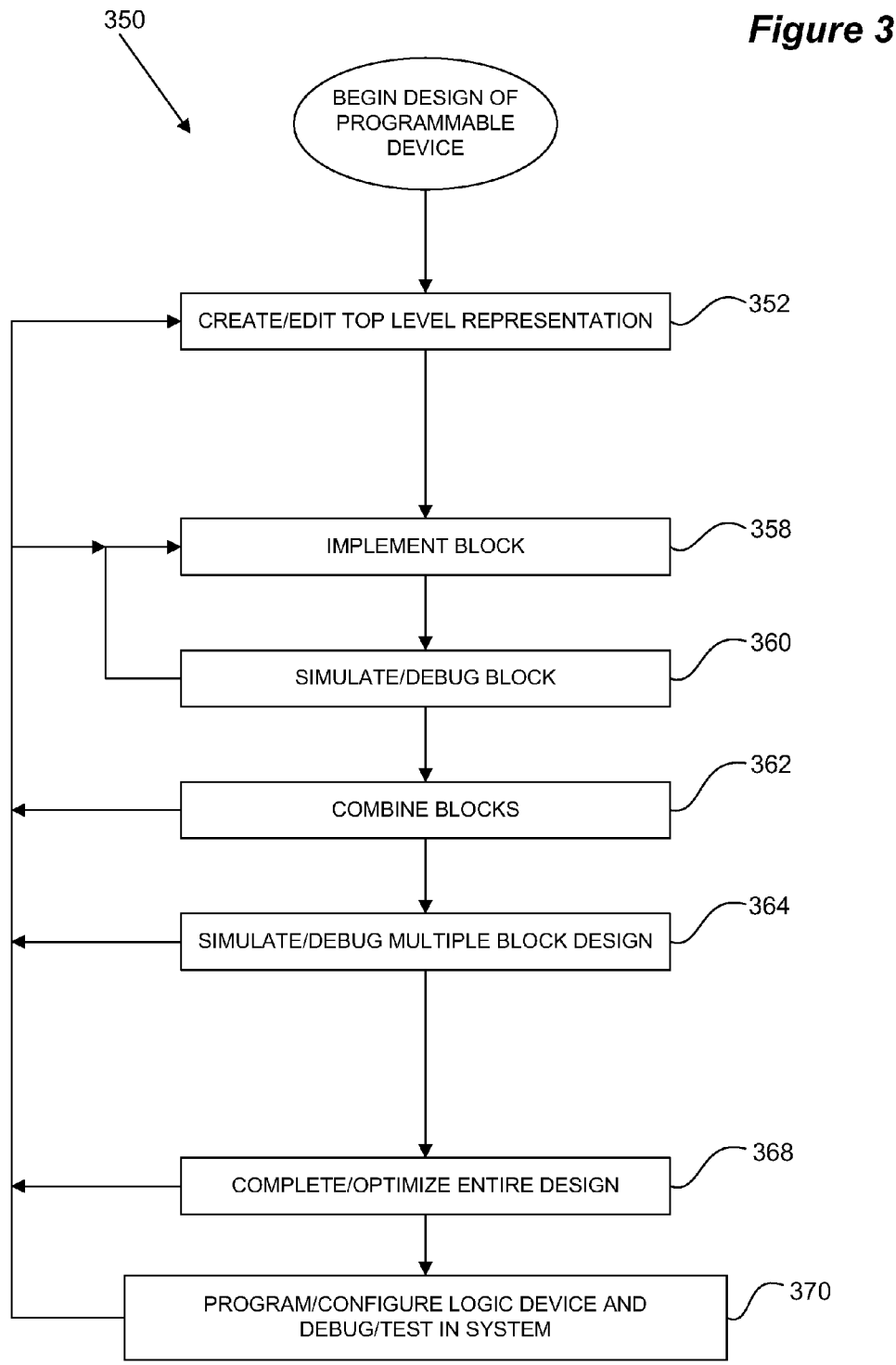
FIG. 3 is a flow diagram showing a design cycle for an electronic design system in which a user can use embodiments of the present invention to assist in software simulation and hardware device debugging.

FIG. 3 shows a design methodology 350 using a system design specification to develop a design with which to program a PLD. Embodiments of the present invention can be used to provide limited visibility of internal nodes of encrypted IP used in this type of process. Such internal node visibility is especially helpful in debugging simulation versions using the encrypted IP as well as debugging hardware implementations of the encrypted IP. As will be appreciated by those skilled in the art, embodiments of the present invention may be practiced in a wide variety of design methodologies. By way of example, the work group computing techniques and system of the present invention work well with an EDA software tool within the framework of the methodology of FIG. 3.

In step 352 a top level system representation for the hardware device to be programmed is created (or, in later iterations of the design, the representation may be edited or amended). This representation may describe, for example, the device pin names, the functionality of each of the pins, the desired system functionality, timing and resource budgets, etc. and/or may specify connections between lower level designs blocks, which may include blocks that have already been developed, implemented or obtained from another party. Some of these blocks may be encrypted or otherwise opaque to protect the proprietary interests of the owner of IP incorporated in the block(s).

Next, in step 358, each block of the top level design is implemented using the EDA tool. It is noted that for more complicated designs, there may be additional levels of block diagrams (that is, blocks within blocks). Furthermore, a block may be compiled through to a fitting stage for a particular integrated circuit die to provide information about resource utilization, timing performance, etc., as required for a given design. An engineer may first design, then compile and simulate, and then return to design again if the simulation results are not satisfactory. In another style, an engineer may iterate through a number of designs followed by simulation loops before finally compiling the complete design.

Concerning block implementation order, one or more of the following factors can be used to determine implementation order: (1) the complexity of a block; (2) the uncertainty or risk associated with a block; and/or (3) how far upstream and/or downstream in a given data-path the block resides. Each of steps 360, 362, 364, 368 and 370 may also lead back to this block implementation step for additional implementation necessitated by later changes in the design.

In step 360 a block is simulated. The simulation results can be displayed or otherwise presented/recorded as waveforms, text or annotated onto the source files. The designer may also return to step 358 to implement a block again. Also, at this point a block may be compiled or a timing analysis performed. The simulation models can be tested separately or instantiated in a whole or partial design, and simulated using a VHDL or Verilog HDL simulator. Debugging of the block may involve a block including encrypted IP. This debugging can be performed using one or more embodiments of the present invention. Again, debugging can be performed in several ways, in hardware and via software simulation, as described above. Simulation debugging can be done using VHDL and/or Verilog simulation netlists (IP functional simulation models) that be simulated with any VHDL or Verilog simulator. In addition, using Altera's Quartus, the software simulation can be done in the Quartus software without the need for VHDL or Verilog IP functional simulation models Once the designer is satisfied with the simulation results of the individual blocks, in step 362 blocks are combined and the resulting multiple block design is simulated and/or debugged at step 364. Again, the simulation results can be displayed either as waveforms or annotated onto the source files. In some cases, it may be useful to complete a full compilation. Also, output simulation vectors from one block may become the input simulation vectors to the next block. The designer may also return to step 352 to modify the top level representation or to step 358 to implement a block again. Again, debugging of multiple blocks may be performed on encrypted or otherwise opaque IP blocks using one of the embodiments of the present invention.

One of a wide variety of compile techniques may be used to compile the design, depending upon the type of design being created. For example, in a PLD, compilation includes the steps of synthesis, place and route, generation of programming files and simulation. For a traditional integrated circuit design with a custom layout, compilation includes a layout version schematic, a design rule checker and simulations. For integrated circuit design using a high level design tool, compilation includes design, function simulation, debugging, modification, re-simulation, place and route, re-simulation with timing while making necessary design changes along the way. For printed circuit boards, compilation includes automatic routing, design rule checking, lumped parameter extraction and simulation. Of course, other types of compilation and variations on the above are possible.

Following compilation, in step 368 the entire system design can be completed so optimized, again making any changes to the design that are necessary. Preferably, optimization is not performed prior to step 368 because full compilation is usually required to establish the location of one or more critical paths within the design. Finally, in step 370 the hardware device is programmed/configured (for example, using programming unit 214) and tested in the system. Once the design is implemented in a hardware device, analysis and debugging may be performed. Using the present invention, hardware debugging of opaque IP can be done using various tools, such as Altera's SignalTap® logic analyzer, which is a system-level debugging tool that captures and displays real-time signal behavior in a system-on-a-programmable-chip (SOPC), providing the ability to observe interactions between hardware and software in system designs. Comprised of soft intellectual property (IP) cores, programming hardware, and analysis software, the logic analyzer allows a user to inspect the FPGA's internal signals while they are running at system speeds, as well as view the captured data as waveforms on a PC, workstation or other computer or computer system.

To use the SignalTap® logic analyzer, a file is created that includes all of the configuration settings and stores the captured data. During Quartus software compilation, the logic analyzer is automatically placed with the rest of the design. The resulting programming file is then used to configure the target FPGA. When the target FPGA is properly configured, the logic analyzer begins data capture as soon as all trigger conditions are satisfied. Opaque IP benefiting from the present invention will allow the designer to capture and view signals selected by the designer of the opaque IP, possibly using aliases provided for those nodes if the IP designer has so provided.

The designer again may return to step 352 to modify the top level block or to step 358 to implement a block again. While methodology 350 presents a top-down design process, it may also be used to support a bottom-up type methodology. Now that a general design methodology has been described by which an engineer may develop a design for a PLD, opaque IP usable in such a system will now be discussed.

Figure 4:
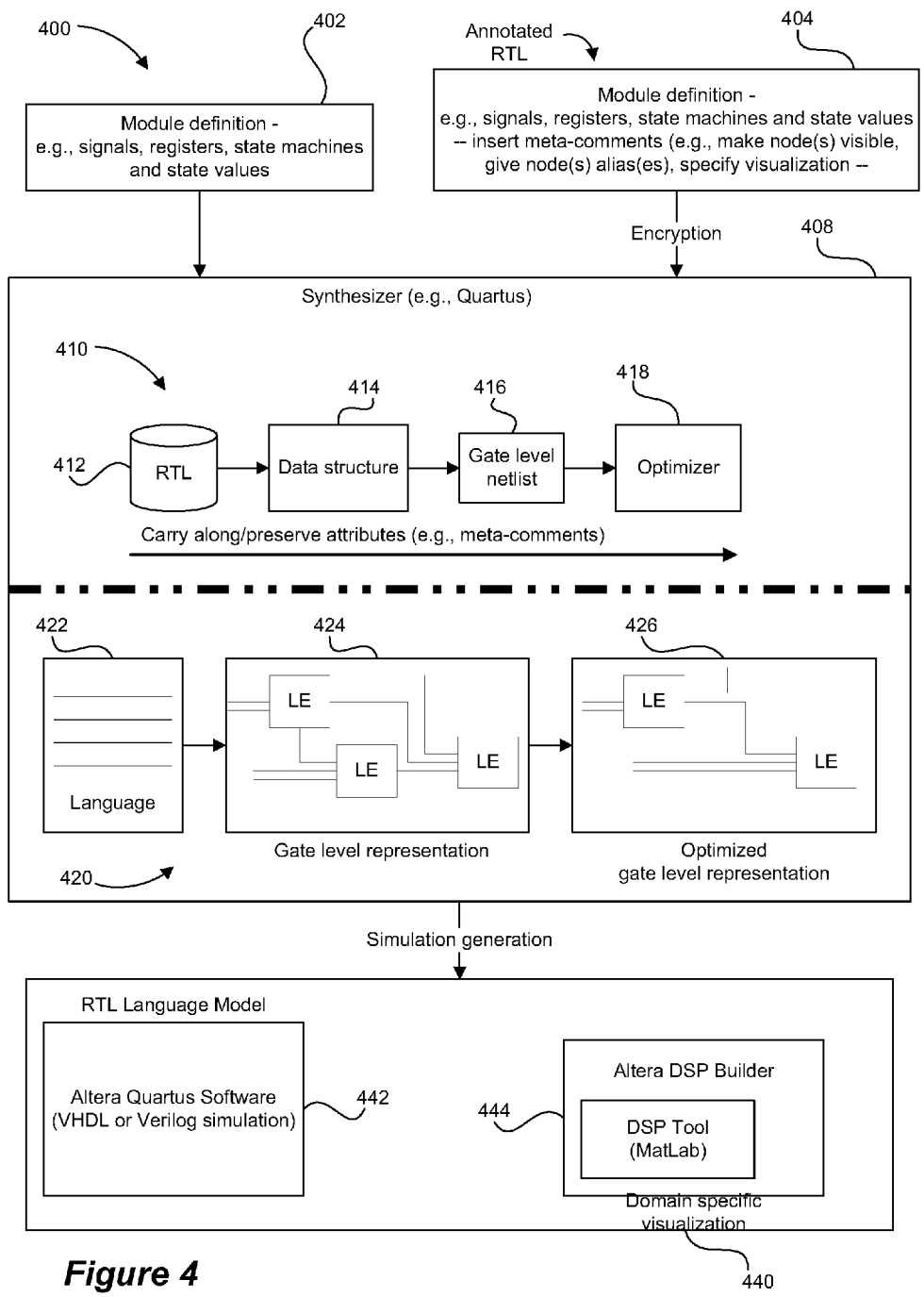
FIG. 4 is a block and flow diagram showing the creation and use of partially opaque IP in connection with the development of a system design in accordance with embodiments of the present invention.

Another portrayal of a design method using an embodiment of the present invention is shown in FIG. 4. System 400 includes the use of two types of IP. One IP module type 402 uses a standard module definition that is visible to a user such as a system designer. Module 402 can be a standard RTL module. A second type of module 404, according to one embodiment of the present invention, uses the same type of module definition, but is encrypted (or otherwise opaque). In addition to the standard module definition, each module 404 has attributes such as meta-comments that specify nodes within the module definition to make visible to a user, to provide aliases for the visibility-enabled nodes and may allow specification of the visualization mode. Therefore, module 404 constitutes annotated RTL that is opaque IP.

Modules 402 and 404 (perhaps multiple instances of each type) are provided to a synthesizer 408 (for example, Altera's Quartus II software) which, in process 410, takes the RTL modules and puts them into a data structure 414. This data structure is then mapped into a gate level netlist (connection of primitives) 416, which may subsequently be optimized by optimizer 418. Attributes (for example, the meta-comments, pragmas or attributes of module(s) 404) are carried along or preserved throughout process 410.

A parallel version of process 410 is shown as process 420 if FIG. 4. Here, a language representation 422 of the modules is converted to a gate level representation 424 that can subsequently be optimized to an optimized gate level netlist 426.

The netlist generated by synthesizer 408 is then put through simulation generation to generate one or more suitable models for use by a simulator 440. For example, an RTL language model 442 can be generated using Altera's Quartus software (possibly using VHDL or Verilog). Additional models, such as a model 444 suitable can be generated for use with a DSP design tool (for example Altera's DSP Builder used in connection with MatLab Simulink). Model 444 can permit DSP simulation, possibly also allowing domain specific visualization of the signals.

Figure 5:
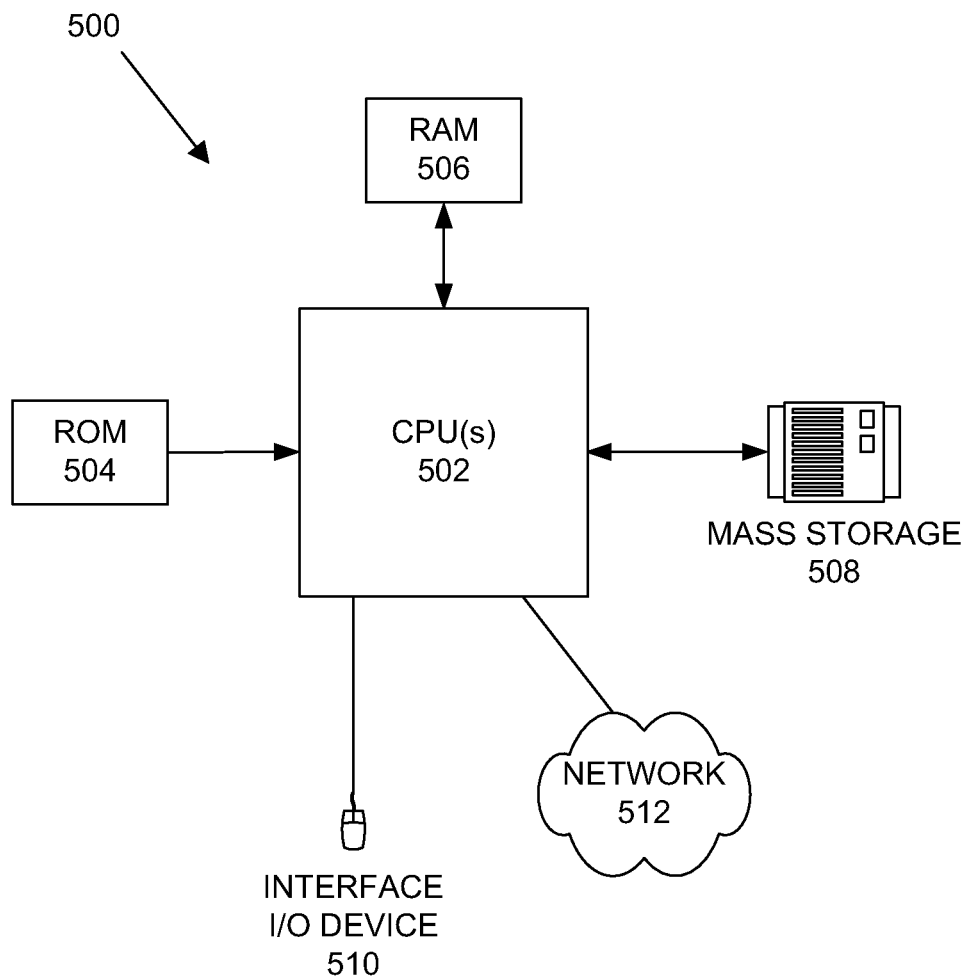
FIG. 5 is a block diagram of a typical computer system suitable for implementing an embodiment of the present invention.

Some or all of the implementation of embodiments of the present invention can be carried out by and/or on a computer or computer system. FIG. 5 illustrates a typical computer system that can be used by a designer and/or other user in accordance with one or more embodiments of the present invention. The computer system 500 includes one or more processors 502 (also referred to as central processing units, or CPUs) that are coupled to storage devices including primary storage 506 (typically a random access memory, or RAM) and another primary storage 504 (typically a read only memory, or ROM). As is well known in the art, primary storage 504 acts to transfer data and instructions uni-directionally to the CPU and primary storage 506 is used typically to transfer data and instructions in a bi-directional manner. Both of these primary storage devices may include any suitable computer-readable media described above, including a computer program product comprising a machine readable medium on which is provided program instructions according to one or more embodiments of the present invention. A mass storage device 508 also is coupled bi-directionally to CPU 502 and provides additional data storage capacity and may include any of the computer-readable media described above, including a computer program product comprising a machine readable medium on which is provided program instructions according to one or more embodiments of the present invention. The mass storage device 508 may be used to store programs, data and the like and is typically a secondary storage medium such as a hard disk that is slower than primary storage. It will be appreciated that the information retained within the mass storage device 508, may, in appropriate cases, be incorporated in standard fashion as part of primary storage 506 as virtual memory. A specific mass storage device such as a CD-ROM may also pass data uni-directionally to the CPU.

CPU 502 also is coupled to an interface 510 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to a computer or telecommunications network using a network connection as shown generally at 512. With such a network connection, it is contemplated that the CPU might receive information from the network, or might output information to the network in the course of performing the above-described method steps. The above-described devices and materials will be familiar to those of skill in the computer hardware and software arts.

The hardware elements described above may define multiple software modules for performing one or more steps and/or operations according to embodiments of the present invention. For example, instructions for running a power consumption estimation program, a design tool or any other appropriate program may be stored on mass storage device 508 or 504 and executed on CPU 502 in conjunction with primary memory 506. In synthesizing a design from a simulation version, a user may use a compiler to generate the design for implementation on hardware.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention is not limited to the details given herein but should be defined by the following claims and their full scope of equivalents, whether foreseeable or unforeseeable now or in the future.

We claim:

1. A method comprising:
receiving, at a processor, instructions for implementing, on a hardware device, an intellectual property (IP) block, the IP block including source code and a plurality of internal circuit nodes, the IP block being encrypted or otherwise opaque such that at least a portion of the plurality of internal nodes are not normally visible, the source code including embedded attributes of at least one internal circuit node of the portion of internal circuit nodes, wherein the attributes enable providing a visualization of the at least one internal circuit node to a user performing simulation or debugging of the hardware device; and
implementing, by using a processor, the IP block on the hardware device, wherein one or both of the instructions and the attributes are encrypted.

2. The method of claim 1, wherein the instructions and the attributes are both encrypted.

3. The method of claim 1, wherein the visualization allows debugging of the device.

4. The method of claim 1, wherein the attributes identify a plurality of signals to be rendered into the visualization.

5. The method of claim 1, wherein the attributes allow for aliasing of the internal circuit node.

6. The method of claim 1, wherein the source code is a register transfer language (RTL) source code.

7. The method of claim 1, wherein the attributes include pragmas.

8. The method of claim 1, wherein the attributes are encrypted.

9. A system comprising:
an interface operable to receive, at a processor, instructions for implementing, on a hardware device, an intellectual property (IP) block, the IP block including source code and a plurality of internal circuit nodes, the IP block being encrypted or otherwise opaque such that at least a portion of the plurality of internal nodes are not normally visible, the source code including embedded attributes of at least one internal circuit node of the portion of internal circuit nodes, wherein the attributes enable providing a visualization of the at least one internal circuit node to a user performing simulation or debugging of the hardware device, the source code including attributes of at least one of the plurality of internal nodes; and
a processor operable to implement the IP block on the hardware device, wherein one or both of the instructions and the attributes are encrypted.

10. The system of claim 9, wherein the instructions and the attributes are both encrypted.

11. The system of claim 9, wherein the visualization allows debugging of the device.

12. The system of claim 9, wherein the attributes identify a plurality of signals to be rendered into the visualization.

13. The system of claim 9, wherein the attributes allow for aliasing of the internal circuit node.

14. The system of claim 9, wherein the attributes include pragmas.

15. The system of claim 9, wherein the attributes are encrypted.

16. A non-transitory computer readable storage medium comprising:
computer code for receiving, at a processor, instructions for implementing, on a hardware device, an intellectual property (IP) block, the IP block including source code and a plurality of internal circuit nodes, the IP block being encrypted or otherwise opaque such that at least a portion of the plurality of internal nodes are not normally visible, the source code including embedded attributes of at least one internal circuit node of the portion of internal circuit nodes, wherein the attributes enable providing a visualization of the at least one internal circuit node to a user performing simulation or debugging of the hardware device; and
computer code for implementing the IP block on the hardware device, wherein one or both of the instructions and the attributes are encrypted.

17. The non-transitory computer readable storage medium of claim 16, wherein the instructions and the attributes are both encrypted.

18. The non-transitory computer readable storage medium of claim 16, wherein the visualization allows debugging of the device.

19. The non-transitory computer readable storage medium of claim 16, wherein the attributes identify a plurality of signals to be rendered into the visualization.

* * * * *